H. NAKAMIZO.
COMBINATION BRAKE AND SKID PREVENTING DEVICE.
APPLICATION FILED FEB. 15, 1917.
1,236,971.
Patented Aug. 14, 1917.
2 SHEETS—SHEET 1.
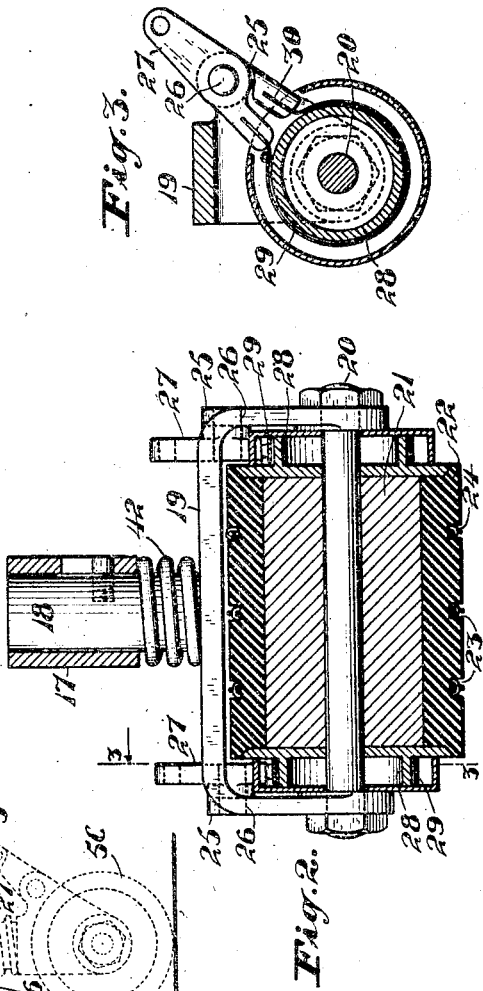
Fig. 3.
Fig. 2.
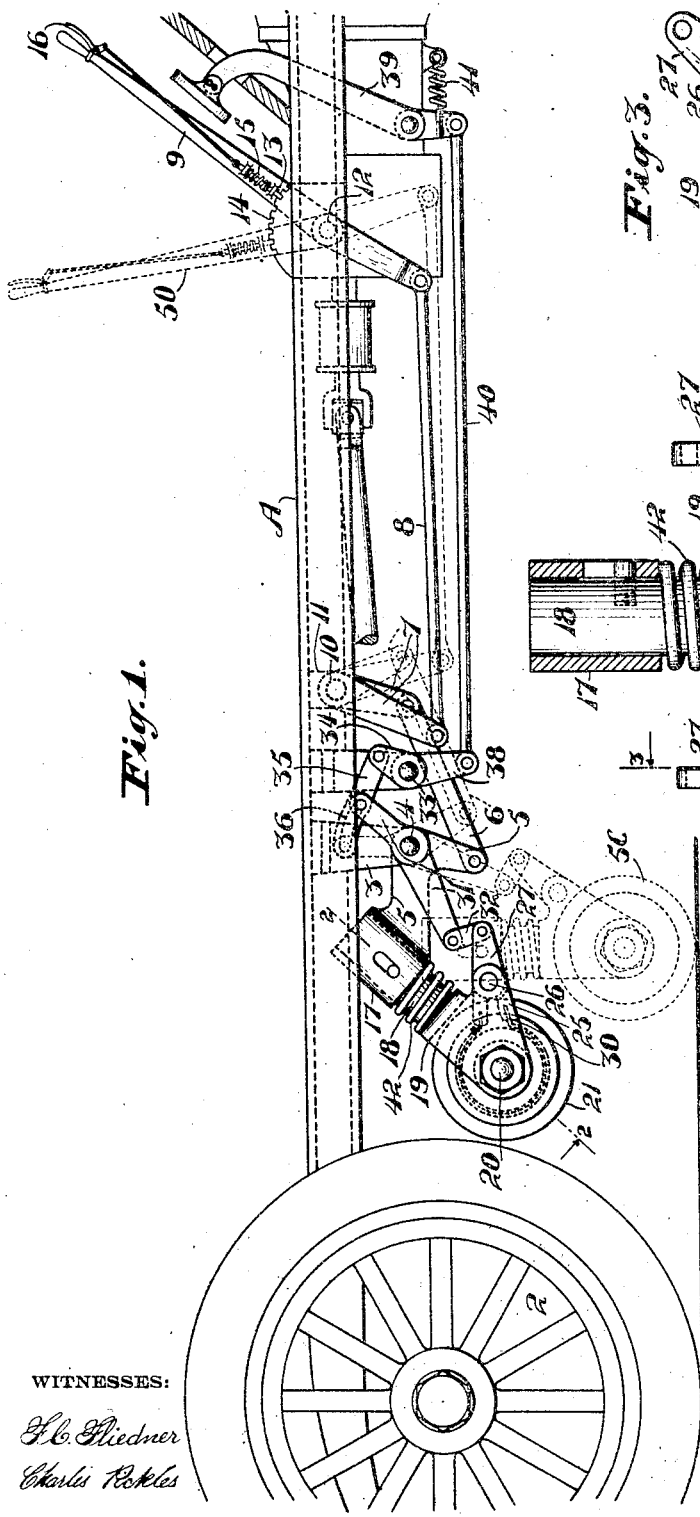
Fig. 1.
WITNESSES:
H. C. Fliedner
Charles Pokles
INVENTOR
H. Nakamizo,
BY Strong & Townsend
ATTORNEYS H. NAKAMIZO.
COMBINATION BRAKE AND SKID PREVENTING DEVICE.
APPLICATION FILED FEB. 15, 1917.

1,236,971.

Patented Aug. 14, 1917.
2 SHEETS—SHEET 2.

WITNESSES:

INVENTOR
H. Nakamizo,
BY Strong & Townsend
ATTORNEYS

UNITED STATES PATENT OFFICE.

HIROTSUNE NAKAMIZO, OF LOS ANGELES, CALIFORNIA.

COMBINATION BRAKE AND SKID-PREVENTING DEVICE.

1,236,971.  Specification of Letters Patent.  Patented Aug. 14, 1917.

Application filed February 15, 1917.  Serial No. 148,748.

*To all whom it may concern:*

Be it known that I, HIROTSUNE NAKAMIZO, a subject of the Emperor of Japan, residing at Los Angeles, in the county of Los Angeles and State of California, have invented new and useful Improvements in Combination Brakes and Skid-Preventing Devices, of which the following is a specification.

This invention relates to a combination brake and skid-preventing device for automobiles.

One of the objects of the present invention is to provide a simple, substantial combination brake and skid-preventing device which is adapted to be attached to the frame of any standard automobile at a point just forward of the rear driving wheels, and which is adapted to be quickly and easily operated by the driver of the car whenever road conditions require its use. Further objects will hereinafter appear.

The invention consists of the parts and the construction and combination of parts as hereinafter more fully described and claimed, having reference to the accompanying drawings, in which—

Figure 1 is a partial side elevation of an automobile, showing the application of the invention.

Fig. 2 is a vertical, longitudinal section on the line 2—2 of Fig. 1.

Fig. 3 is a cross section on line 3—3 of Fig. 2.

Figure 4:
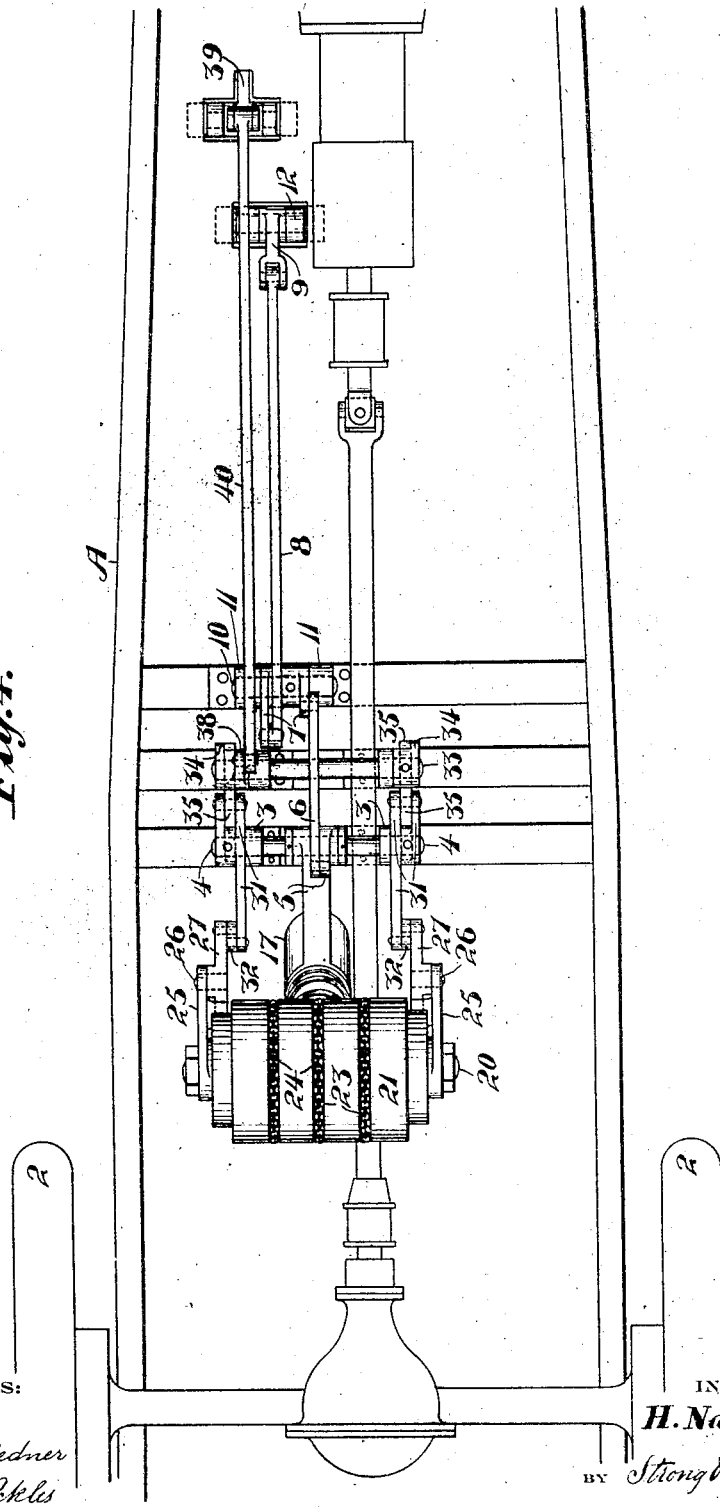
Fig. 4 is a bottom view of Fig. 1.

Referring to the drawings in detail, A indicates the main frame of a standard form of automobile and 2 the rear driving wheels, to which power is transmitted in the usual manner. Secured crosswise of the frame, in suitable bearing brackets 3, is a shaft 4, and pivotally mounted on said shaft is a crank arm 5, one end of which is connected, by means of a link 6, with a bell-crank 7, which in turn is operated by means of a link 8 and a lever 9. The bell-crank 7 is pivotally mounted on a shaft 10 which is supported crosswise of the frame in bearing brackets 11, and one arm of said crank is longer than the other to permit as much increased leverage power as possible. The lever 9 is pivotally mounted on a suitable support, as at 12, and is otherwise provided with a pawl 13 which engages with a square toothed, segmental rack 14 to permit it to be locked against movement in either direction; the pawl 13 being operated in the usual manner by means of a spring 15 and a grip 16.

Formed in the rear end of the crank arm 5 is an angularly positioned cylindrical extension 17; and slidably mounted in said cylindrical extension is a plunger 18, on the lower end of which is secured a fork-shaped bracket 19. Extending through the arms of said bracket is a shaft 20 and secured upon said shaft is a roller 21 which is preferably covered with rubber 22, or like material, to present the best anti-skid surface possible. Formed on the outer face of said rubber covering or facing is a plurality of annular grooves 23 and adapted to be placed in each groove is a chain 24.

Formed on one side of each bearing end of the fork-shaped bracket 19 is an extension 25, and journaled between said extensions is a shaft 26, upon which is secured a pair of levers 27. Formed on each end of the roller 21 is an inclosed brake drum 28 and surrounding each drum is a brake band 29. One end of each brake band is secured, as at 30, to its adjacent extension 25, while the opposite end of each is secured to the inner end of the lever 27.

Pivotally mounted on the shaft 4 is a pair of arms 31 and connecting the lower end of each arm 31 with the arms 27 is a short link 32. Pivotally mounted crosswise of the frame, between the shafts 4 and 10, is a third shaft 33, and secured upon said shaft is a pair of crank arms 34, each of which is connected with the upper adjacent end of the arm 31 by means of a link 35, each link 35 being slotted, as at 36, as will hereinafter be described. Secured upon the shaft 33 is a downwardly extending crank-arm 38 and connecting said arm with a pivotally mounted foot pedal 39 is a rod 40. Adapted to normally maintain the foot pedal in the position shown in Fig. 1 is a spring 41, and interposed between the cylindrical extension 17 and the fork-shaped bracket 19 is a spring 42.

The operation of the device is as follows: If the driver of an automobile equipped with the attachments here shown happens to be driving along a slippery asphalt street on a rainy day, it is possible at all times to obviate any danger of skidding by merely pulling the lever 9 from the full line position shown in Fig. 1 to the dotted line position indicated at 50. This movement of the lever is transmitted through the link 8, bell-crank 7, link 6 and the bell-crank 5 to swing the bell-crank about the shaft 4 until it assumes the dotted line position shown. This brings the rubber faced roller, carrying the chains 24, into engagement with the road or asphalt surface and practically any pressure may be exerted between said surface, the roller and the automobile by the great leverage secured between the lever and the several bell-crank connections; the spring 42, interposed between the arm 5 and the fork-shaped bracket, permitting any yielding movement required if the roller should strike any undulations in the road surface. A constant pressure is in this manner applied, and as the roller is not only rubber faced and studded, if desired, but is also provided with skid chains 24, it can readily be seen that all danger of side skidding is practically eliminated.

If it is desired at the same time to stop the car as quickly as possible, it is only necessary to depress the foot pedal 39; this movement being transmitted through the rod 40 and the several bell-cranks previously described to rock the arms 27 and set the brake bands upon the drums 28. The pin and slot connection 36, affords a lost-motion, or loose connection permitting the arm 31 to move when the roller carrier 5 is operated, without affecting the manual means 39—40, when the carrier is moved to cause the roller to engage the road. The auxiliary brakes thus provided, together with the standard brakes with which all cars are equipped, make it possible to quickly stop the car in emergency cases and also when coasting down steep hills.

The device as a whole is simple and substantial in construction and as it is operated entirely by means of the foot pedal 39 and the lever 9, it can readily be seen that it may be quickly operated whenever required. The device, when attached to a car, is, practically speaking, invisible when not in use as it is mounted under the main frame at a point just ahead of and between the rear driving wheels. It is not only possible to attach the device to any standard car now in use, but as it is mounted under the car it should not be objected to as it will not occupy any space that might otherwise be utilized.

The materials and finish of the several parts of the device are such as the experience and judgment of the manufacturer may dictate.

I wish it understood that various changes in form, proportions, and minor details of construction may be resorted to within the scope of the appended claims, and that I do not wish to limit myself to the specific design and construction here shown.

Having thus described my invention, what I claim and desire to secure by Letters Patent is—

1. In an anti-skid device, a pivoted crank arm, a sleeve rigidly connected to one member of said crank arm, a wheel carrying member having a stem slidably mounted in said sleeve, a spring for normally holding the stem at the limit of its outward movement, a bell crank, a link connecting one arm of the bell crank and the other member of the crank arm, and means connected to the other arm of the bell crank for actuating same.

2. In an anti-skid device, a pivoted crank arm, a sleeve rigidly connected to one member of said crank arm, a wheel carrying member having a stem slidably mounted in said sleeve, a spring for normally holding the stem at the limit of its outward movement, and means having connection with the other member of the crank arm for actuating same.

3. In an anti-skid device, a road engaging roller, a carrier therefor, a braking device for holding the roller against rotation movable with the carrier, means common to the carrier and braking device for pivotally and independently supporting each, means to actuate the carrier to move the roller into anti-skid position, means to actuate the braking device and means whereby said last named means may remain quiescent during actuation of the carrier.

4. In an anti-skid device, a road engaging roller, a carrier therefor, a braking device for holding the roller against rotation movable with the carrier, means common to the carrier and braking device for pivotally and independently supporting each, means to actuate the carrier to move the roller into anti-skid position, means to actuate the braking device, and lost-motion means whereby the carrier may be operated into anti-skid position without movement of the braking device into roller braking position.

5. In an anti-skid device, a road engaging roller, a pivoted carrier rotatably supporting said roller, means to actuate the carrier to cause the element to engage the road, means to brake the roller, means to actuate said braking means pivoted independently of the carrier pivot so as to allow the carrier to move independently thereof, and means to operate said pivoted actuating means of the braking means.

6. In an anti-skid device, a road engaging roller, swingable means rotatably supporting said roller, braking means for the roller, means movable with the swingable means for operating said braking means, means to actuate the swingable means to move the roller into road engaging position, manual means to actuate said means for operating the braking means, and a loose connection between the manual means and the braking operating means whereby the swingable means may be moved without affecting movement of the manual means.

7. In an anti-skid device, a road engaging roller, swingable means rotatably supporting said roller, braking means for the roller, a pivoted member connected to the braking means for actuating the latter, manual means to operate the braking actuating means, and a lost-motion connection between the pivoted member and the manual means to allow the swingable means to move without affecting said manual means.

8. In an anti-skid device, a rotatable road engaging roller, means to move said roller into road engaging position, braking means for the roller, means independent of said roller moving means for operating the braking means to allow selective operation of the latter and means whereby said means for operating the braking means may remain quiescent during movement of the roller into road engaging position.

In testimony whereof I have hereunto set my hand in the presence of two subscribing witnesses.

HIROTSUNE NAKAMIZO.

Witnesses:
 JOHN H. HERRING,
 W. W. HEALEY.